2,867,654
ACYLATION OF α-MONOAMINO CARBOXYLIC ACIDS

Bernard W. Town, Mount Vernon, N. Y., assignor to Schwarz Laboratories, Inc., a corporation of New York No Drawing. Application January 27, 1955
Serial No. 484,573

12 Claims. (Cl. 260—518)

This invention relates to the acylation of amino acids, and more particularly of α-monoamino acids.

Known procedures for acylation of amino acids have involved the Schotten-Baumann reaction of treating the amino acid with acyl chloride in caustic solution, or the procedure of Knoop and Blanco (Z. Physiol. Chem. 146, 267, 1925) of treating the amino acid with acetic anhydride in glacial acetic acid at elevated temperatures, i. e., about 100° C.

However, these classical procedures have inherent handicaps, one of the most important of which is the tendency of many amino acids to form internal ring structures known as oxazolones (Reaction I) or oxazolines (Reaction II).

(I)
$$RCHCOOH + (R'CO)_2O \longrightarrow$$
$$\underset{NH_2}{|}$$

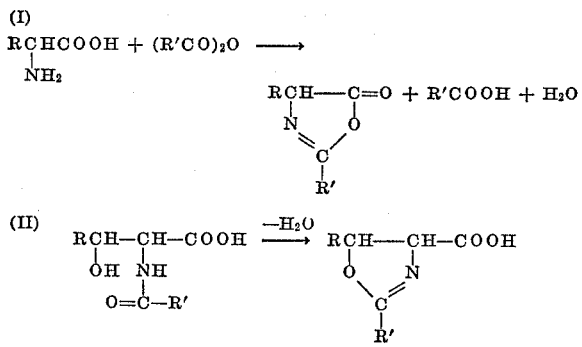

(II)
$$RCH-CH-COOH \xrightarrow{-H_2O} RCH---CH-COOH$$

In the above formulas R is the residue of the amino acid; R' is an alkyl group.

Reaction II, is peculiar to hydroxy or keto amino acids, particularly serine, which is known to be especially difficult to acylate.

There is the further problem that hydroxy- and thiolamino acids such as serine, threonine and cysteine tend to form O-acyl or S-acyl as well as N-acyl derivatives, or mixtures thereof.

Furthermore, conditions which favor oxazoline and oxazolone formation also favor racemization, as these internal ring structures are optically inactive, and form racemic mixtures when the ring is ruptured. The formation of racemic mixtures with consequent destruction of the amino acid being treated is, of course, objectionable.

It is among the objects of this invention to provide a simple, efficient and convenient method for acylating α-monoamino acids which method substantially reduces the tendency for oxazoline and oxazolone formation.

Another object of the invention is to provide a process for the acylation of α-monoamino hydroxy and thiolamino acids in which N-substitution is favored.

It is still another object of this invention to provide a process for producing acyl derivatives of α-monoamino acids resulting in high yields of N-acyl amino acids of high purity, thus materially reducing the need for further purification of the N-acyl derivative which would otherwise be necessary.

Other objects and advantages of this invention will be apparent from the following detailed description thereof.

In accordance with this invention the α-monoamino acid is reacted with an acylating agent having the formula

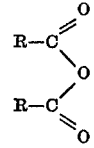

in which R is alkyl containing from 1 to 5 carbon atoms or a chloro-substituted alkyl group containing from 1 to 5 carbon atoms, employing from 1 to 3 molar equivalents of the acylating agent per mol of the α-monoamino acid. By molar equivalent is meant the amount of acylating agent required to react with 1 mol of amino acid to replace one of the hydrogens of the amino group with the acyl radical.

Another important feature of the invention is that the reaction is carried out in the presence of water which is deliberately added to act as a moderator for the reaction and prevent the formation of oxaxolines, oxazolones and O-acyl or S-acyl derivatives. For this purpose the amount of water in the reaction mixture should be such as to provide a ratio of amino acid to water of from 1:9 to 1:1.5 on a weight basis. Surprisingly, I have found that the presence of water in these amounts does not impede the progress of N-acylation, nor render crystallization or recovery of the desired acylated amino acid derivative difficult and yet minimizes the formation of oxazolines, oxazolones and O-acyl or S-acyl derivatives. This is indeed surprising because it was generally recognized that, in order to obtain effective acylation employing acid anhydride, anhydrous conditions must be maintained in order to avoid hydrolysis of the acylating agent and yet by deliberately adding water as moderator and employing the conditions of this invention effective acylation is obtained with the additional desirable results of minimizing undesired side reactions.

The reaction should be carried out at a temperature such that the amino acid is in solution in the reaction mixture constituted of acylating agent and water. Preferably the temperature is maintained below 50° C. Operating under such temperature conditions, particularly at a temperature below 50° C., and employing water as a moderator and the amount of acylating agent hereinabove set forth, I have found the tendency for racemization is minimized with the over-all result that substantially complete N-acylation occurs resulting in excellent yields of the desired acylated amino acid of high purity.

In a preferred embodiment of the invention an aqueous solution of α-monoamino acid containing an amino acid and water in the proportions above set forth is treated with successive portions of the acylating agent, allowing each portion to react before the next portion is added. In general, the amount of each portion or increment of acylating agent added is from 0.1 to 0.4 molar equivalents of the amino acid and successive increments are added at from 10 to 30 minute intervals until a negative ninhydrin reaction (indicating complete N-acylation) is obtained. In the case of the soluble α-monoamino acids these additions can be made at room temperature. When the amino acid contains a hydroxy group as in the case of serine or threonine, maintenance of temperatures below 35° C. is particularly desirable. With less soluble amino acids the reaction may be carried out at any temperature below 100° C., which provides sufficient dissolved amino acid to keep the reaction going. Preferably the temperature is maintained below 50° C.

After the reaction is completed, the excess aliphatic acid formed by reaction of the acylating agent with water is distilled off under reduced pressure and the N-acyl amino acid recovered in any conventional manner, e. g., by crystallization from a suitable solvent. For use in resolution procedures, the aqueous concentrate of N-acyl amino acid is frequently pure enough to be used directly.

The concentration of the amino acid in the reaction mixture desirably is within the range of from 10% to 40% by weight.

As the α-monoamino acid acylated in accordance with this invention the following are considered the most important: methionine (α-amino-γ-methyl mercapto butyric acid, $CH_3SCH_2CH_2CH(NH_2)COOH$), cysteine (α-amino-β-thiolpropionic acid, $HSCH_2CH(NH_2)COOH$, valine (α-aminoisovaleric acid, $(CH_3)_2CHCH(NH_2)COOH$), glutamic acid (α-aminoglutaric acid, $$HOOC(CH_2)_2CH(NH_2)COOH$$

serine (α-amino-β-hydroxypropionic acid, $$HOCH_2CH(NH_2)COOH$$

threonine (α-amino-β-hydroxy butyric acid, $$CH_3CH(OH)CH(NH_2)COOH$$

isoleucine (α-amino-β-methyl valeric acid, $$C_2H_5(CH_3)CHCH(NH_2)COOH$$

phenylalanine (α-amino-β-phenylpropionic acid, $$C_6H_5CH_2CH(NH_2)COOH$$

and alanine (α-aminopropionic acid, $$CH_3CH(NH_2)COOH$$

Examples of acylating agents which may be employed are the anhydrides of acetic, propionic, butyric and valeric acids, as well as the anhydrides of the chloro-substituted aliphatic acids containing from 1 to 5 carbon atoms, such, for example, as chloro-acetic anhydride, chloropropionic anhydride, etc.

The following examples are given for purposes of illustrating the invention. It will be understood the invention is not limited to these examples.

*Example I*

1 kg. of L-glutamic acid is suspended under agitation in 1700 ml. of water maintained at 50° C. Then successive 150 ml. portions of acetic anhydride are added at 15 minute intervals. (Total 1500 ml.: 2.2 molar equivalents.) The glutamic acid is completely dissolved after the 6th addition, and no further heating is required. The solution is tested with ninhydrin before each addition of anhydride after all of the amino acid present has dissolved. No color development with ninhydrin indicates that all of the α-amino N has been acetylated. This occurred after the 10th addition of anhydride. The solution was then cooled to 4° C., whereupon copious crystals formed, which were filtered and dried. Yield 1050 grams, 82% of theoretical. Rotation on one recrystallization from water: $[\alpha]_D^{25} = -16.6°$ (2% in $H_2O$).

*Example II*

500 grams of DL-serine are dissolved in 2500 ml. of water in a 5 liter closed vessel with agitation and provision for cooling. 100 ml. portions of acetic anhydride are added at 30 minute intervals. The temperature tends to rise after each addition, but is maintained below a maximum of 35° C. The reaction of the mixture to ninhydrin reagent is tested before each addition. After 1200 ml. of anhydride (2.6 equivalent) had been added the ninhydrin reaction is negative, and the acetylation is complete. The reaction mixture is concentrated in vacuo to a syrup, 500 ml. of water are added, and the solution reconcentrated twice in order to remove most of the excess acetic acid, whereupon N-acetyl DL-serine crystallizes out. This is recovered by filtration and used directly for preparation of optically pure serine isomers by treatment with acylase.

*Example III*

131 grams of a mixture of L-isoleucine and D-alloisoleucine in approximately equal proportions are suspended in 300 ml. of water and heated to 50° C. Successive 10 ml. portions of acetic anhydride are added. (All material dissolves after the first addition of anhydride.) The mixture is tested with ninhydrin after each addition. After a total of 130 ml. (1.4 equivalents) are added no color develops in the ninhydrin reaction, indicating complete acetylation of the amino group. The reaction mixture is evaporated to dryness at reduced pressure, toluene and water are added and the mixture reconcentrated to remove the last traces of acetic acid. After extracting the residue with 30% acetone in water, to remove a small amount of oily impurity which formed, the residue is recrystallized from hot water. Recovered 123 grams (71% of theoretical).

*Example IV*

16.5 grams of commercial DL-phenylalanine is suspended in 100 ml. of 25% acetic acid (used to promote solubility) with provision for agitation. Three 10 ml. portions of acetic anhydride are added at 10 minute intervals. The temperature rises to 40° C. and is maintained at this level. The ninhydrin test is made after each addition with the following results:

| ml. Acetic anhydride | Ninhydrin reaction |
|---|---|
| 10 ml | Strongly positive. |
| 20 ml | Positive. |
| 30 ml. (3 mols) | Reaction substantially complete. |

The undissolved material (apparently an impurity in the original product, wt. 1.5 gms. M. P. 231–234° C.) is removed by filtration. The filtrate is evaporated to an oil, treated with toluene, and re-evaporated; whereupon a solid mass forms. This is dissolved in 100 ml. of water to which 30 ml. of ethanol are added. On cooling an oil is formed which rapidly becomes crystalline. Yield 18.7 grams, 90% of theoretical, M. P. 148° C.

*Example V*

100 grams of DL-alanine in 250 ml. of water are treated with successive 20 ml. portions of chloroacetic anhydride with agitation. The temperature rises to about 50° C. during the additions, which are made at 20 minute intervals. Ninhydrin tests are made as previously described. After 200 ml. of anhydride (1.9 equivalents) are added the test is negative. The reaction mixture is concentrated to a syrup and the N-chloracetyl DL-alanine crystallized from water and alcohol. Yield 130 grams (69% of theoretical).

*Example VI*

100 grams DL-alanine in 300 ml. of water are treated with successive 20 ml. portions of propionic anhydride at 15 minute intervals at 50° C. The ninhydrin reaction becomes negative after the 12th addition (240 ml. anhydride: 1.7 equivalents). The reaction mixture is then concentrated to a syrup at reduced pressure, treated with water and re-evaporated in vacuo twice to remove propionic acid. The oily residue is crystallized from water and alcohol. Yield N-propionyl DL-alanine 115 grams, 70% of theoretical.

The acylated α-monoamino acid derivatives produced in accordance with this invention are useful as intermediates in the synthesis of peptides and in the preparation of pure optical isomers of these amino acids which are becoming increasingly important in nutrition and in the development of therapeutic products.

As many changes could be made in the above process and many widely different embodiments of this invention could be made without departing from the scope of the claims, it is intended that all matter contained in the above description shall be interpreted as illustrative and not in a limiting sense.

Having thus described my invention, what I claim as new and desire to secure by Letters Patent of the United States is:

1. The process of N-acylating α-monoamino carboxylic acids which comprises reacting an α-monoamino carboxylic acid at a temperature below 100° C., with an acylating agent having the formula

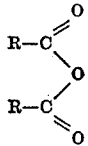

in which R is from the group consisting of alkyl containing 1 to 5 carbon atoms and chloralkyl containing 1 to 5 carbon atoms, employing from 1 to 3 molar equivalents of acylating agent per mol of said α-monoamino acid and in the presence of sufficient water to provide a ratio of amino acid to water of from 1:9 to 1:1.5.

2. The process as defined in claim 1, in which the temperature of the reaction mixture is maintained below 50° C.

3. The process as defined in claim 1, in which the acylating agent is added to the reaction mixture of amino acid and water in increments of from 0.1 to 0.4 molar equivalents of the amino acid.

4. The process as defined in claim 1, in which the concentration of the amino acid in the water amino acid reaction mixture is from 10% to 40% by weight.

5. A process of N-acetylating α-monoamino carboxylic acids which comprises mixing the α-monoamino carboxylic acid with water to produce a mixture in which the ratio of amino acid to water is within the range of from 1 to 9 to 1 to 1.5, adding to this mixture while at a temperature not exceeding about 50° C. an acylating agent having the formula

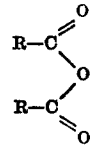

in which R is from the group consisting of alkyl containing 1 to 5 carbon atoms and chloralkyl containing 1 to 5 carbon atoms in small increments until the total amount of acylating agent added is from 1 to 3 molar equivalents of the amount of amino acid present in the mixture and then isolating the N-acyl α-monoamino acid from the reaction mixture.

6. The process defined in claim 5, in which L-glutamic acid is the α-amino acid and acetic anhydride is the acetylating agent.

7. The process defined in claim 5, in which DL-serine is the α-amino acid and acetic anhydride is the acetylating agent.

8. The process defined in claim 5, in which L-isoleucine is the α-amino acid and acetic anhydride is the acetylating agent.

9. The process defined in claim 5, in which DL-phenylalanine is the α-amino acid and acetic anhydride is the acetylating agent.

10. The process defined in claim 5, in which DL-alanine is the α-amino acid and chloracetic anhydride is the acetylating agent.

11. A process for N-acylating serine which comprises suspending the serine in from 1.5 to 9 times its weight of water, treating this suspension with 1.5–3.0 equivalents of an acid anhydride selected from the group consisting of acetic, chloracetic, propionic, butyric and valeric anhydride, in succesive portions of 0.1 to 0.4 molar equivalents of said anhydride, at temperature below 50° C. until the reaction mixture gives substantially no color with ninhydrin reagent, concentrating the solution so obtained, removing the volatile acid present, and recovering the N-acyl serine from the reaction mixture.

12. A process for N-acylating β-hydroxy-α-monoamino aliphatic carboxylic acids which comprises suspending said acid in from 1.5 to 9 times its weight of water, treating this suspension with 1.5–3.0 equivalents of an acid anhydride selected from the group consisting of acetic, chloracetic, propionic, butyric and valeric anhydride, in successive portions of 0.1 to 0.4 molar equivalents of said anhydride, at temperature below 50° C. until the reaction mixture gives substantially no color with ninhydrin reagent, concentrating the solution so obtained, removing the volatile acid present, and recovering the N-acyl β-hydroxy α-monoamino aliphatic carboxylic acid from the reaction mixture.

References Cited in the file of this patent

UNITED STATES PATENTS

| | | |
|---|---|---|
| 2,368,067 | Lynch | Jan. 23, 1945 |
| 2,394,230 | Billman | Feb. 5, 1946 |
| 2,492,554 | Chodroff et al. | Dec. 27, 1949 |
| 2,745,873 | Callanan et al. | May 15, 1956 |